US010083641B2

(12) United States Patent
Kim et al.

(10) Patent No.: US 10,083,641 B2
(45) Date of Patent: Sep. 25, 2018

(54) ELECTRONIC APPARATUS, METHOD OF CALIBRATING DISPLAY PANEL APPARATUS, AND CALIBRATION SYSTEM

(71) Applicant: Samsung Electronics Co., Ltd., Suwon-si (KR)

(72) Inventors: Min-jung Kim, Seoul (KR); Nam-kyun Beon, Seoul (KR); Sang-kyun Im, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/287,243

(22) Filed: Oct. 6, 2016

(65) Prior Publication Data

US 2017/0103694 A1 Apr. 13, 2017

(30) Foreign Application Priority Data

Oct. 12, 2015 (KR) ........................ 10-2015-0141936

(51) Int. Cl.

| | |
|---|---|
| ***G09G 5/02*** | (2006.01) |
| ***G06T 11/00*** | (2006.01) |
| ***H04N 1/60*** | (2006.01) |
| ***H04N 5/57*** | (2006.01) |
| ***G09G 3/00*** | (2006.01) |

(52) U.S. Cl.

CPC ..... *G09G 3/006* (2013.01); *G09G 2320/0693* (2013.01); *G09G 2360/145* (2013.01); *G09G 2360/16* (2013.01)

(58) Field of Classification Search

CPC combination set(s) only.

See application file for complete search history.

(56) References Cited

U.S. PATENT DOCUMENTS

| | | | | |
|---|---|---|---|---|
| 7,274,346 | B2 | 9/2007 | Cok et al. | |
| 7,907,154 | B2 | 3/2011 | Rykowski et al. | |
| 2005/0001986 | A1* | 1/2005 | Matsuda | G09G 3/002 353/31 |
| 2005/0134599 | A1* | 6/2005 | Nayar | G06T 3/00 345/589 |
| 2014/0043350 | A1* | 2/2014 | Ikeda | G01J 1/02 345/589 |
| 2014/0152706 | A1* | 6/2014 | Park | G09G 3/2003 345/690 |
| 2014/0240341 | A1* | 8/2014 | Oda | G09G 5/02 345/590 |
| 2015/0123957 | A1 | 5/2015 | Jun et al. | |

FOREIGN PATENT DOCUMENTS

| | | |
|---|---|---|
| JP | 2006-125895 | 5/2006 |
| KR | 10-2014-0054750 | 5/2014 |

* cited by examiner

*Primary Examiner* — Wesner Sajous

(74) *Attorney, Agent, or Firm* — Staas & Halsey LLP

(57) ABSTRACT

An electronic apparatus includes a communicator configured to communicate with a display panel apparatus and a processor configured to divide an image acquired by capturing a display panel into a plurality of sub blocks, calculating representative values of the plurality of sub blocks, calculate calibration values of the plurality of sub blocks based on a target value set based on the calculated representative values and the representative values of the plurality of sub blocks, and transmit the calculated calibration values to the display panel apparatus.

17 Claims, 13 Drawing Sheets

ELECTRONIC APPARATUS, METHOD OF CALIBRATING DISPLAY PANEL APPARATUS, AND CALIBRATION SYSTEM

CROSS-REFERENCE TO RELATED APPLICATIONS

This application claims priority from Korean Patent Application No. 10-2015-0141936, filed on Oct. 12, 2015, in the Korean Intellectual Property Office, the disclosure of which is incorporated herein by reference in its entirety.

BACKGROUND

1. Field

Apparatuses and methods consistent with the embodiments relate to an electronic apparatus, a method of calibrating a display panel apparatus, and a calibration system, and more particularly, to an electronic apparatus that calibrates a display panel apparatus by transmitting a calibration value to the display panel apparatus, a method of calibrating the display panel apparatus, and a calibration system.

2. Description of the Related Art

The development of electronic technology has developed and distributed various types of electronic apparatuses. In particular, display panel apparatuses have been mainly used in general homes, offices, outdoor signage, and the like.

Among them, a light-emitting diode (LED) display panel apparatus may show brightness and color that are generated by the same current and are variable according to characteristics of LED devices constituting the LED display panel apparatus. Therefore, non-uniformity of brightness and color may occur in the whole LED display panel apparatus.

Pixels of an LED display panel may be calibrated in order to solve this non-uniformity of the brightness and color of the LED display panel apparatus. In general, the pixels of the LED display panel are calibrated when manufacturing, selling, and installing modules constituting the LED display panel apparatus or replacing merely a part of an LED display for after service (AS).

In detail, if brightness and color are changed by deterioration of LED devices of the LED display panel apparatus occurring after the LED display panel apparatus showing calibrated brightness and color is installed and then time elapses, a change degree of the brightness and color varies according to a characteristic of each of the LED devices so as to perform the calibration.

Therefore, since non-uniformity of brightness and color of each LED occurs in the LED display panel apparatus, there is a need for a method of calibrating the LED display panel apparatus.

According to an existing technology, calibration is performed with respect to each of LED pixels constituting a display panel of a display apparatus or with respect to each of modules of the display apparatus. However, if the calibration is performed with respect to each of the LED pixels, there is a large amount of data to be processed, and thus a calibration time becomes long. Also, if the calibration is performed with respect to each of the modules, a calibration performance may be lowered, and color and brightness may look different in each module.

SUMMARY

Additional aspects and/or advantages will be set forth in part in the description which follows and, in part, will be apparent from the description, or may be learned by practice of the embodiments.

Exemplary embodiments overcome the above disadvantages and other disadvantages not described above. Also, the embodiments are is not required to overcome the disadvantages described above, and an exemplary embodiment may not overcome any of the problems described above.

The embodiments provide an electronic apparatus that calculates a calibration value of each sub block and transmits the calculated calibration value to a display panel apparatus, a method of calibrating the display panel apparatus, and a calibration system.

According to an aspect, an electronic apparatus for calibrating a pixel value of a display panel constituting a display panel apparatus, includes a communicator configured to communicate with the display panel apparatus, and a processor configured to divide an image acquired by capturing the display panel into a plurality of sub blocks, calculate representative values of the plurality of sub blocks, calculate calibration values of the plurality of sub blocks based on a target value set based on the calculated representative values and the representative values of the plurality of sub blocks, and transmit the calibration values to the display panel apparatus.

The processor may calculate an average value of pieces of data indicating brightness and color of each of a plurality of pixels constituting the sub block as a representative value of the sub block.

The pieces of data indicating the brightness and color of each of the plurality of pixels may be color coordinates x, y and luminance Y in a CIE xyY color space indicating color and brightness of a pixel.

The processor may set an average value of a plurality of representative values respectively corresponding to the plurality of sub blocks as the target value.

The processor may determine sizes of the plurality of sub blocks based on a resolution of the display apparatus or a value input by a user.

The processor may calibrate pixel values constituting the plurality of sub blocks based on the target value and representative values of the plurality of sub blocks and transmit calibration coefficients used for calibrating the pixel values to the display panel apparatus.

The processor may calculate calibration coefficients respectively corresponding to the plurality of sub blocks based on the target value and the representative values of the plurality of sub blocks and transmit the calculated calibration coefficients to the display panel apparatus.

The image acquired by capturing the display panel may be an image which is captured and then whose brightness and color are measured by a colorimeter.

The image acquired by capturing the display panel may be an image that is captured by a camera installed inside or outside the electronic apparatus.

According to another aspect, a calibration system includes a display panel apparatus, a measurement apparatus configured to capture a preset image displayed on a display panel and measures brightness and color corresponding to the image, and an electronic apparatus configured to divide the image received from the measurement apparatus into a plurality of sub blocks, calculate representative values of the plurality of sub blocks, calculate calibration values of the plurality of sub blocks based on a target value set based on the calculated representative values and the representative values of the plurality of sub blocks, and transmit the calibration values to the display panel apparatus.

According to another aspect, a method of controlling an electronic apparatus for calibrating a pixel value of a display panel constituting a display panel apparatus, includes dividing an image acquired by capturing the display panel into a plurality of sub blocks, calculating representative values of the plurality of sub blocks, calculating calibration values of the plurality of sub blocks based on a target value set based on the calculated representative value and the representative values of the plurality of sub blocks, and transmitting the calculated calibration values to the display panel apparatus.

The calculating of the representative values may include calculating an average value of pieces of data indicating brightness and color of each of a plurality of pixels constituting the sub block as a representative value of the sub block.

The pieces of data indicating the brightness and color of each of the plurality of pixels may be color coordinates x, y and luminance Y in a CIE xy Y color space indicating color and brightness of a pixel.

The calculating of the calibration values may include setting an average value of a plurality of representative values respectively corresponding to the plurality of sub blocks as the target value.

The dividing of the plurality of sub blocks may include determining sizes of the plurality of sub blocks based on a resolution of the display panel apparatus or a value input by a user.

The calculating of the calibration values may include calibrating pixel values respectively constituting the plurality of sub blocks based on the target value and the representative values of the plurality of sub blocks. The transmitting may include transmitting the calibrated pixel values to the display panel apparatus.

The calculating of the calibration values may include calculating pixel values of the plurality of sub blocks to be calibrated, based on the target value and the representative values of the plurality of sub blocks. The transmitting may include transmitting the calculated pixel values to the display panel apparatus.

The image acquired by capturing the display panel may be an image which is captured and then whose brightness and color are measured by a colorimeter.

The image acquired by capturing the display panel may be an image that is captured by a camera installed inside or outside the electronic apparatus.

According to various exemplary embodiments as described above, a calibration value of each sub area may be calculated and then transmitted to a display panel apparatus. Therefore, a time taken for calibrating the display panel apparatus may be reduced, and a calibration performance may be optimized.

According to another aspect a non-transitory computer readable medium storing a method of controlling an electronic apparatus for calibrating a pixel value of a display panel constituting a display panel apparatus is provided, the method including dividing an image acquired by capturing the display panel into a plurality of sub blocks, calculating representative values of the plurality of sub blocks, calculating calibration values of the plurality of sub blocks based on a target value set based on calculated representative values and representative values of the plurality of sub blocks and transmitting calculated calibration values to the display panel apparatus.

According to another aspect a calibration system is provided, including a display panel apparatus, a measurement apparatus configured to capture a preset image displayed on a display panel of the display panel apparatus and measure brightness and color corresponding to the image, and a computer to divide the image received from the measurement apparatus into a plurality of sub blocks, calculate representative values of the plurality of sub blocks, calculate calibration values of the plurality of sub blocks based on a target value set based on calculated representative values and representative values of the plurality of sub blocks, and transmit the calibration values to the display panel apparatus.

According to another aspect a method of calibrating a display panel is provided, the method including dividing an image of the display panel into blocks, calculating values representing each block as calculated representation values, calculating calibration values of the blocks using a target value set based on the calculated representative values and representative values of the blocks and transmitting the calibration values to the display panel.

According to another aspect a method of calibrating a display includes dividing pixels of the display panel into groups, determining a calibration value for each group of pixels, and calibrating each group of pixels of the display panel using a corresponding calibration value.

Additional and/or other aspects and advantages of the embodiments will be set forth in part in the description which follows and, in part, will be obvious from the description, or may be learned by practice thereof.

BRIEF DESCRIPTION OF THE DRAWINGS

The above and/or other aspects of the embodiments will be more apparent by describing certain exemplary embodiments with reference to the accompanying drawings, in which.

DETAILED DESCRIPTION

Figure 1:
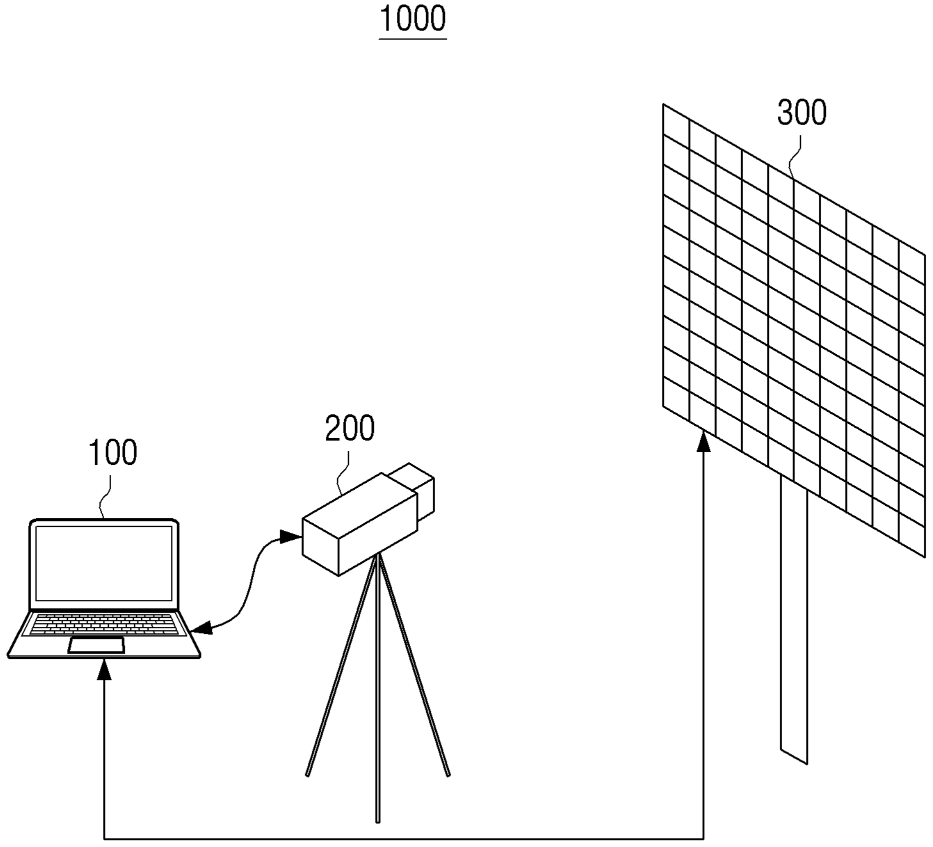
FIG. 1 illustrates a configuration of a display panel apparatus calibration system according to an exemplary embodiment.

Reference will now be made in detail to the embodiments, examples of which are illustrated in the accompanying drawings, wherein like reference numerals refer to the like elements throughout. The embodiments are described below by referring to the figures.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding. Thus, it is apparent that the exemplary embodiments can be carried out without those specifically defined matters. Also, well-known functions or constructions are not described in detail since they would obscure the embodiments with unnecessary detail.

FIG. 1 illustrates a configuration of a display panel apparatus calibration system 1000 according to an exemplary embodiment.

As shown in FIG. 1, the display panel apparatus calibration system 1000 according to the exemplary embodiment includes an electronic apparatus 100, a measurement apparatus 200, and a display panel apparatus 300.

The electronic apparatus 100 may be realized as various types of user terminal apparatuses such as a personal computer (PC), a laptop PC, a portable phone, a tablet PC, and the like but is not limited thereto. The electronic apparatus 100 may also be realized as an apparatus that calibrates merely a display panel apparatus.

The measurement apparatus 200 may be realized as a camera, a colorimeter, or the like. However, in general, a camera type colorimeter is used as the measurement apparatus 200 in order to measure brightness and color of pixels of the display panel apparatus 300. Here, the camera type colorimeter may include a Charge-Coupled Device (CCD) sensor, a lens, a body, and the like and may measure brightness and color of the pixels of the display panel apparatus 300. The measured brightness and color of the pixels of the display panel apparatus 300 may be stored as data of luminance (Lv), x, y coordinate, or X, Y, Z coordinate forms.

The measurement apparatus 200 may be located at a preset distance from the display panel apparatus 300 and may be fixed in one place until calibration of the display panel apparatus 300 is completed. However, the measurement apparatus 200 is not limited thereto and may move before the calibration of the display panel apparatus 300 is completed. An exposure, an aperture, a focus, and the like of the measurement apparatus 200 may be automatically set or may be manually set if a user wants. Also, a method of setting the exposure, the aperture, the focus, and the like of the measurement apparatus 200 may be changed according to types of measurement equipment.

Also, the measurement apparatus 200 may capture a preset image displayed on the display panel of the display panel apparatus 300 and measure brightness and color corresponding to the captured image. For example, read (R), green (G), and blue (B) of a full color may be displayed on the display panel, and white (W) may be additionally displayed. If R, G, and B are displayed in a full color on the display panel, the measurement apparatus 200 may capture a whole part of the display panel. Also, W may be added. However, if it is impossible to capture the image at a time with the measurement apparatus 200 due to a large size of the display panel apparatus 300, the display panel of the display panel apparatus 300 may be divided into two or more areas to perform the capturing.

The measurement apparatus 200 may be separated from the electronic apparatus 100 to be located outside the electronic apparatus 100 or may be located inside the electronic apparatus 100. The measurement apparatus 200 may also be combined with the electronic apparatus 100 to be constituted as one apparatus. In other words, one apparatus into which the electronic apparatus 100 and the measurement apparatus 200 are combined may capture the preset image displayed on the display panel apparatus 300 and calculate a calibration value.

The electronic apparatus 100 may divide an image acquired by capturing the display panel into a plurality of sub blocks. In detail, the electronic apparatus 100 may determine sizes of the plurality of sub blocks based on a resolution of the display panel. For example, if the resolution of the display panel is 33×16, a size of a divisible sub block may be 3×1, 3×2, 3×4, 11×1, 11×2, 11×4, or the like. Also, as a size of a sub block is small, a pixel value may be accurately calculated. Therefore, the electronic apparatus 100 may divide the display panel into sub blocks each having the smallest size of sizes of divisible sub blocks. However, the electronic apparatus 100 may respectively receive sizes of sub blocks from a user. In this case, the electronic apparatus 100 may divide the display panel into sub blocks having input sizes.

The electronic apparatus 100 may also calculate representative values of the plurality of sub blocks and set a target value based on the calculated representative values. In detail, the electronic apparatus 100 may calculate an average value of pixel values of pixels included in the plurality of sub blocks as a representative value. Here, the pixel values are values indicating brightness and color of pixels, for example, may be represented with coordinates in a CIE xyY color space. If a representative value is calculated, the electronic apparatus 100 may set a target value based on the calculated representative value. For example, the target value may be set as an average value of representative values respectively corresponding to sub areas. However, a representative value and a target value have been described as being respectively set as an average value of pixel values and an average value of representative values in the above-described exemplary embodiment but are not limited thereto. For example, the representative value and the target value may be set as various values like 80% or 90% of an average value.

Also, the electronic apparatus 100 may calculate calibration values of the plurality of sub blocks based on the target value and the representative values of the plurality of sub blocks. Here, the calibration values are values that are respectively applied to pixels to calibrate a pixel value of each pixel as a target value. In other words, the electronic apparatus 100 may transmit a calibration value to the display panel apparatus 300, and the display panel apparatus 300 may perform calibration by applying a calibration value corresponding to a sub area to each pixel included in the sub area or the electronic apparatus 100 may transmit a calibration value, by which calibration is performed with respect to each pixel, to the display panel apparatus 300.

The display panel apparatus 300 performs calibration of a pixel value of the display panel by using a calibration value received from the electronic apparatus 100. In detail, the display panel apparatus 300 may perform calibration by applying a calibration value of each sub area received from the electronic apparatus to a pixel value included in each sub area or may perform calibration by applying a calibration value of each pixel received from the electronic apparatus 100 to each pixel.

In general, the display panel apparatus 300 includes light-emitting diode (LED) pixels but is not limited thereto. The display panel apparatus 300 may include various types of display panels requiring uniform calibrations like OLEDs.

According to various exemplary embodiments as described above, a calibration value of each sub area may be calculated and then transmitted to a display panel apparatus.

Therefore, a time taken for calibrating the display panel apparatus may be reduced, and a calibration performance may be optimized.

Figure 2:
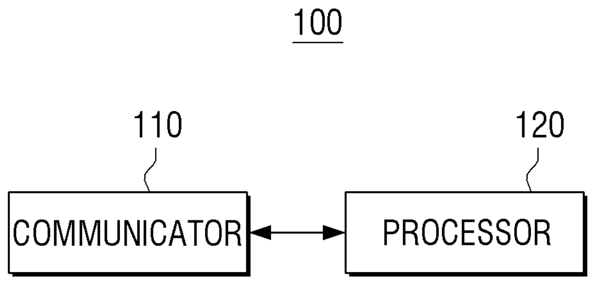
FIG. 2 is a block diagram of a configuration of an electronic apparatus according to an exemplary embodiment.

FIG. 2 is a block diagram of a configuration of an electronic apparatus 100 according to an exemplary embodiment.

Referring to FIG. 2, the electronic apparatus 100 according to the exemplary embodiment includes a communicator 110 and a processor 120.

The communicator 110 communicates with the measurement apparatus or the display panel apparatus 300. Here, the communicator 120 may communicate with the display panel apparatus 300 through various types of communication methods such as BlueTooth (BT), Wireless Fidelity (WI-FI), Zigbee, Infrared (IR), a Serial Interface, a Universal Serial Bus (USB), Near Field Communication (NFC), and the like.

The communicator 110 may receive an image, which is acquired by capturing the display panel of the display panel apparatus 300, from the measurement apparatus 200 or may receive a pixel value of the display panel. Here, the pixel value refers to a value indicating information about brightness and color of each pixel included in the display panel. For example, the pixel value may be a coordinate value in a CIE xyY color space indicating brightness and color of a pixel. However, if the measurement apparatus 200 is combined with the electronic apparatus 100 into one apparatus, the electronic apparatus 100 may calculate a calibration value by using the captured image and the pixel value of the display panel without an additional receiving process.

The communicator 110 may also transmit a calibration value to the display panel apparatus 300. In detail, if the processor 120 calculates calibration values of a plurality of sub blocks, the communicator 110 may calibrate a pixel value of the display panel constituting the display panel apparatus 300 by transmitting the calculated calibration values to the display panel apparatus 300.

The processor 120 may divide the image acquired by capturing the display panel into a plurality of sub blocks and calculate representative values of the plurality of sub blocks. In detail, the processor 120 may determine sizes of the plurality of sub blocks based on a resolution of the display panel apparatus 300 or a value input from a user and divide the captured image of the display panel into sub blocks respectively having the determined sizes. For example, a size of a sub block may be set as an aliquot or as a value input from the user.

If the plurality of sub blocks are divided, the processor 120 may calculate representative values of the plurality of sub blocks. In detail, the processor 120 may calculate an average value of pixel values of pixels included in the plurality of sub blocks as a representative value. Here, a pixel value may be a coordinate value in a CIE xyY color space indicating brightness and color of a pixel.

Also, the processor 120 may set a target value based on the calculated representative value. In detail, the processor 120 may calculate an average value of representative values respectively corresponding to the plurality of sub blocks and set the calculated average value as a target value. However, the processor 120 is not limited thereto and may set various values like 80% or 90% of an average value as a target value.

In addition, the processor 120 may calculate calibration values of the plurality of sub blocks based on the target value and the representative values respectively corresponding to the plurality of sub blocks. For example, the processor 120 may calculate a value, which is to be multiplied so as to make a representative value into a target value, as a calibration value or may calculate a value, which is acquired by multiplying a pixel value of a pixel included in a sub block corresponding to the representative value by a value to be multiplied so as to make a representative value into a target value, as a calibration value.

For example, if a representative value of a first sub area is 2, and a target value is 6, a calibration value may be 3. In this case, the processor 120 may transmit the calibration value 3 of the first sub area to the display panel apparatus 300, and the display panel apparatus 300 may perform calibration with respect to each pixel value of the first sub area by multiplying a pixel value of each pixel included in the first sub area by the calibration value 3.

As another example, if a representative value of a first sub area is 2, a target value is 6, and a pixel value of a first pixel of the first sub area is 2, a calibration value of the first pixel of the first sub area may be 6. In other words, a value which is acquired by multiplying the pixel value 2 of the first pixel by value 3 to be multiplied so as to make a representative value into a target value may be a calibration value. In this case, the processor 120 may transmit the pixel value 6 of the first pixel of the first sub area to the display panel apparatus 300, and the display panel apparatus 300 may perform calibration with respect to the first pixel of the first sub area by setting the pixel value of the first pixel of the first sub area as 6.

However, the above-described exemplary embodiments are merely an exemplary embodiment, and the processor 120 may control to calculate a calibration value according to various methods and transmit the calculated calibration value to the display panel apparatus 300.

The processor 120 may check whether a value by which calibration is performed by respectively applying calibration values to pixel values of pixels included in a plurality of sub areas is spec in. If the value is spec in, the processor 120 may complete calibration with respect to a pixel of the display panel. If the value is spec out, the processor 120 may iterate the calibration with respect to the pixel of the display panel.

For example, if a value by which calibration is performed by applying a calibration value to a pixel value of each pixel included in a plurality of sub areas is out of a preset spec (specification) range, the processor 120 may iterate calibration with respect to a pixel of the display panel, by determining the value as being spec out (out of specifications).

Alternatively, if the number of values out of the preset spec range is higher than or equal to a preset number, the processor 120 may iterate calibration with respect to the pixel of the display panel by determining the values as spec out.

Figure 3A:
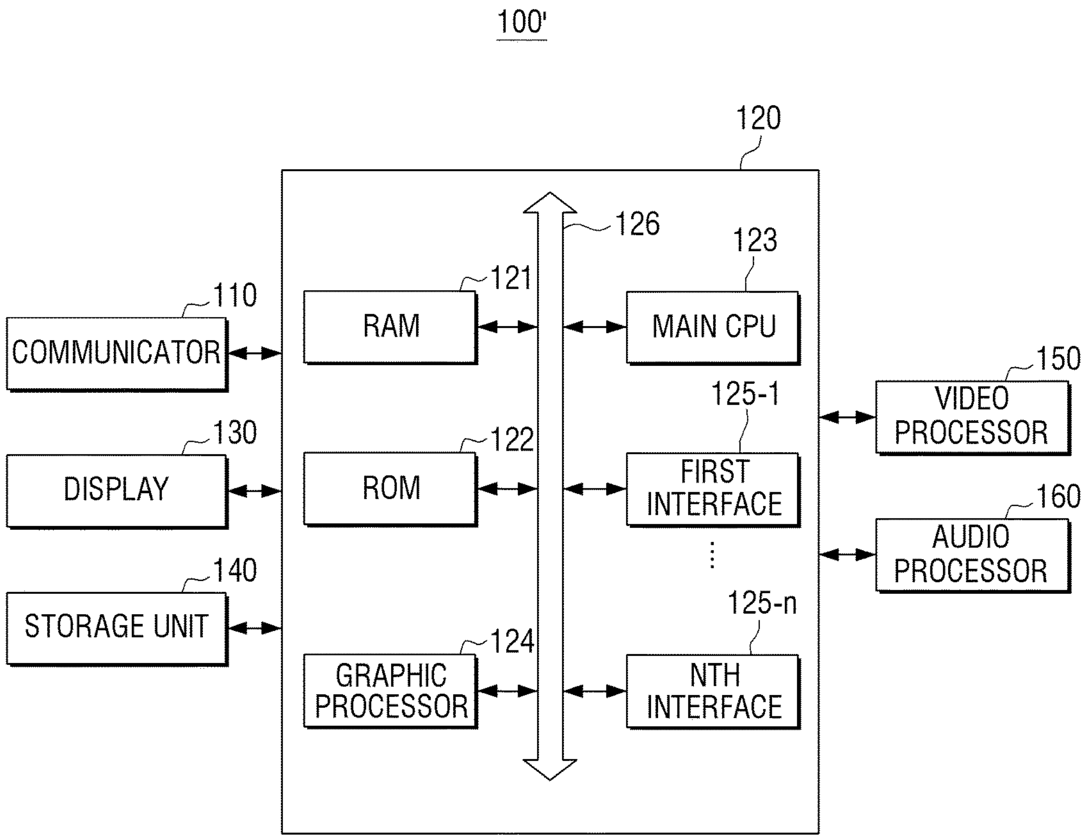
FIGS. 3A and 3B are block diagrams of a detailed configuration of an electronic apparatus as shown in FIG. 2, according to an exemplary embodiment.
Figure 3B:
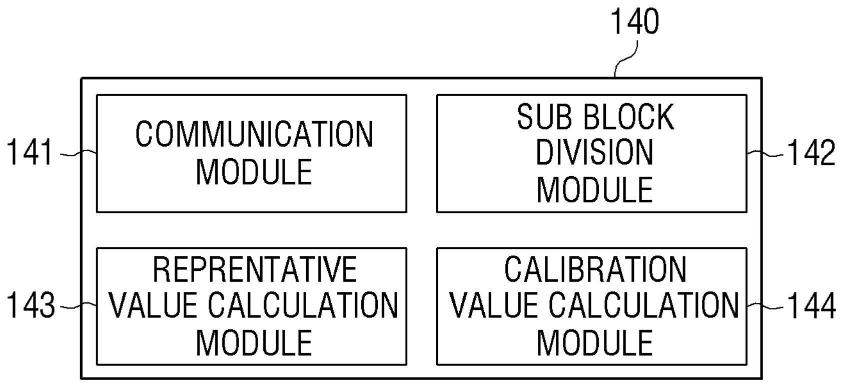

FIGS. 3A and 3B are block diagrams of a detailed configuration of an electronic apparatus 100' as shown in FIG. 2, according to an exemplary embodiment.

FIG. 3A is a block diagram of the detailed configuration of the electronic apparatus 100' as shown in FIG. 2. Referring to FIG. 3A, the electronic apparatus 100' includes a communicator 110, a processor 120, a display 130, a storage unit 140, a video processor 150, and an audio processor 160. Detailed descriptions of elements of FIG. 3A overlapping with elements of FIG. 2 are omitted.

The processor 120 controls an overall operation of the electronic apparatus 100'.

In detail, the processor 120 includes a random access memory (RAM) 121, a read only memory (ROM) 122, a main central processing unit (CPU) 123, a graphic processor 124, first through nth interfaces 125-1 through **125-*n*, and a bus 126**.

The RAM 121, the ROM 122, the main CPU 123, the graphic processor 124, and the first through nth interfaces 125-1 through **125-*n* may be connected to one another through the bus 126**.

The first through nth interfaces 125-1 through **125-*n*** are connected to various types of elements as described above. One of interfaces may be a network interface that is connected to an external apparatus through a network.

The main CPU 123 performs booting by using an operating system (O/S) stored in the storage unit 140 by accessing the storage unit 140. Also, the main CPU 123 may perform various types of operations by using various types of programs, contents, data, and the like stored in the storage unit 140.

The ROM 122 stores a command set and the like for system booting. If a turn-on command is input, and thus power is supplied, the main CPU 123 copies the 0/S stored in the storage unit 140 into the RAM 121 and executes the 0/S to boot a system according to a command stored in the ROM 122. If the booting of the system is completed, the main CPU 123 copies various types of application programs stored in the storage unit 140 into the RAM 121 and executes the application programs copied into the RAM 121 to perform various types of operations.

The graphic processor 124 may generate a screen including various types of objects such as an icon, an image, a text, and the like, for example, a screen including objects indicating brightness and colors of pixels of a display panel apparatus, by using an operator (not shown) and a renderer (not shown). The operator (not shown) may calculate representative values of a plurality of sub areas based on a received control command and set a target value based on the calculated representative values. The renderer (not shown) generates a screen including an object based on the target value calculated by the operator (not shown). The screen generated by the renderer (not shown) may be displayed in a user interface area.

An operation of the processor 120 may be performed by a program stored in the storage unit 140 as shown in FIG. 3B.

The storage unit 140 stores various types of data such an O/S software module for driving the electronic apparatus 100', various types of multimedia contents, and the like.

In particular, as shown in FIG. 3B, the storage unit 140 may store programs, such as a communication module 141, a sub block division module 142, a representative value calculation module 143, and a calibration value calculation module 144, and the like, necessary for calculating and transmitting a calibration value according to an exemplary embodiment.

The processor 120 may receive an image, which is acquired by capturing a display panel, and a pixel of each pixel of the display panel from the measurement apparatus 200 and transmit a calibration value calculated by the processor 120 to the display panel apparatus 300 by using the communication module 141.

For example, if the captured image of the display panel of the display panel apparatus 300 is received from the measurement apparatus 200 by using the communication module 141, the processor 120 may determine a size of a sub block and divide the captured image into sub blocks each having the determined size by using the sub block division module 142. The processor 120 may calculate representative values of a plurality of sub blocks by using the representative value calculation module 143. In this case, a representative value may be an average value of pixel values of pixels included in the plurality of sub blocks.

The processor 120 may calculate calibration values of the plurality of sub blocks based on a target value set based on the calculated representative values and the representative values of the plurality of sub blocks, by using the calibration value calculation module 144. Here, the calibration values may be values that are used to perform calibration with respect to pixel values of pixels included in the plurality of sub blocks or values that may be applied to pixels included in the plurality of sub blocks.

The display 130 may be realized as various types of displays such as a liquid crystal display (LCD), an organic light-emitting diode (OLED), liquid crystal on silicon (LCoS), digital light processing (DLP), and the like.

The electronic apparatus 100' may further include the video processor 150 that performs processing with respect to video data, the audio processor 160 that performs processing with respect to audio data, a speaker that outputs various types of audio data processed by the audio processor 160, various types of notification sounds, voice messages, and the like, a camera that captures a still image or a moving image under control of the user, a microphone that receives a user voice or other sounds and converts the user voice or the other sounds into audio data, and the like.

Calculations of calibration values of a plurality of sub blocks have been described as being performed in the electronic apparatus 100' in the above-described exemplary embodiment. However, this is merely an exemplary embodiment, and the calculations of the calibration values may be performed by an algorithm stored in the display panel apparatus 300.

Figure 4:
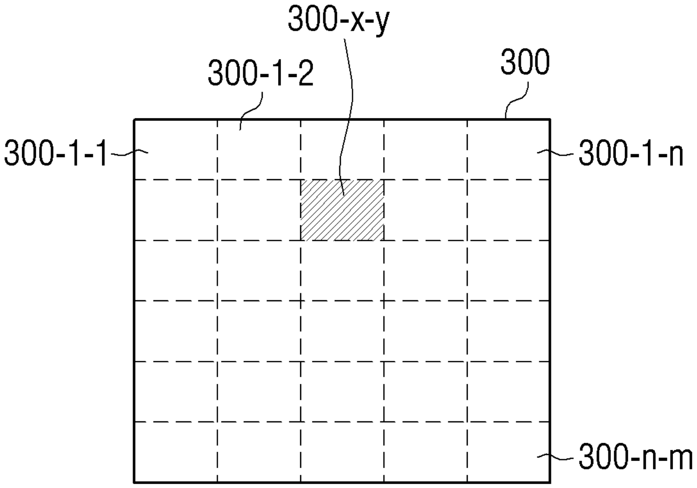
FIG. 4 illustrates a method of dividing a plurality of sub blocks, according to an exemplary embodiment.

FIG. 4 illustrates a method of dividing a plurality of sub blocks, according to an exemplary embodiment.

Referring to FIG. 4, the processor 120 may divide an image, which is acquired by capturing a display panel constituting the display panel apparatus 300, into a plurality of sub blocks 300-1-1, 300-1-2, . . . , **300-1-*m*, . . . , and 300-*n*-*m***.

For example, the processor 120 may determine sizes of a plurality of sub blocks based on a resolution of the display panel apparatus 300. If the sizes of the plurality of sub blocks are determined, the processor 120 divides the captured image into the plurality of sub blocks 300-1-1, 300-1-2, . . . , **300-1-*m*, . . . , and 300-*n*-*m*** respectively having the determined sizes.

Thereafter, the processor 120 may calculate representative values of the plurality of sub blocks 300-1-1, 300-1-2, . . . , **300-1-*m*, . . . , and 300-*n*-*m***. In other words, the representative values may be differently calculated according to the plurality of sub blocks.

The processor 120 may calculate an average value of representative values of the first sub block 300-1-1, the second sub block 300-1-2, . . . , and an xth sub block **300-*x*-*y*** to set a target value. However, the target value is not limited to an average value of representative values and may have various values like 80% of the average value of the representative values, and the like.

If the target value is set, the processor 120 may calculate calibration values of a plurality of sub blocks. Here, the calibration values may be differently calculated according to the plurality of sub blocks.

If calibration values are calculated according to sub areas, the processor 120 may transmit the calibration values to the display panel apparatus 300, and the display panel apparatus 300 may perform calibration of the display panel by applying the calculated calibration values to a pixel value of a corresponding sub area.

FIGS. 5A through 5E illustrate a method of calibrating a display panel apparatus, according to an exemplary embodiment.

Figure 5A:
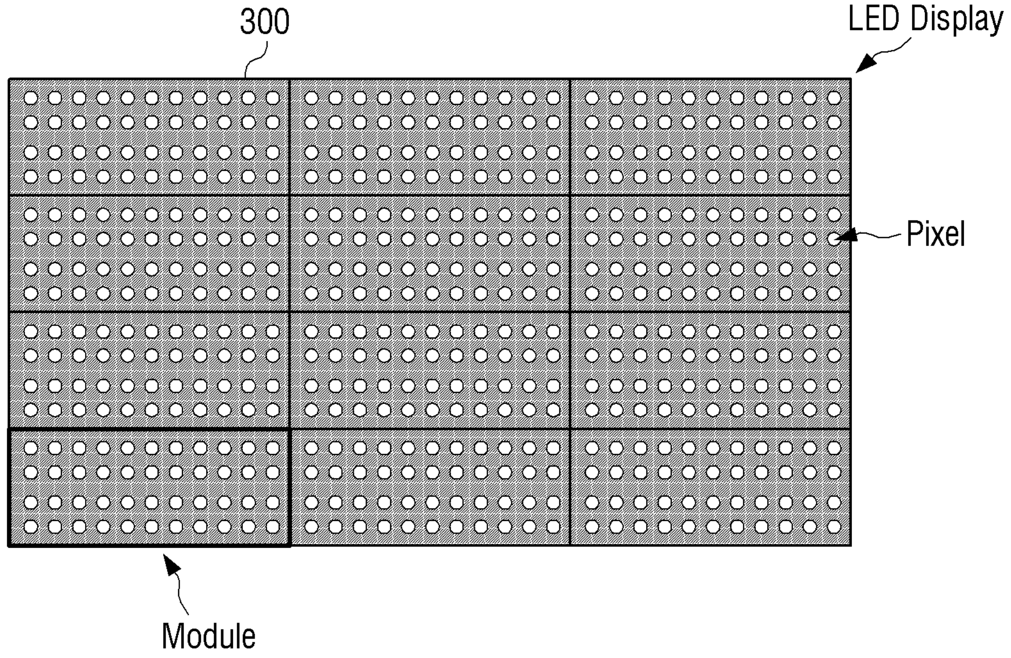
FIGS. 5A through 5E illustrate a method of calibrating a display panel apparatus, according to an exemplary embodiment.

As shown in FIG. 5A, a display panel constituting the display panel apparatus 300 may include a plurality of pixels and modules having preset sizes.

Figure 5B:
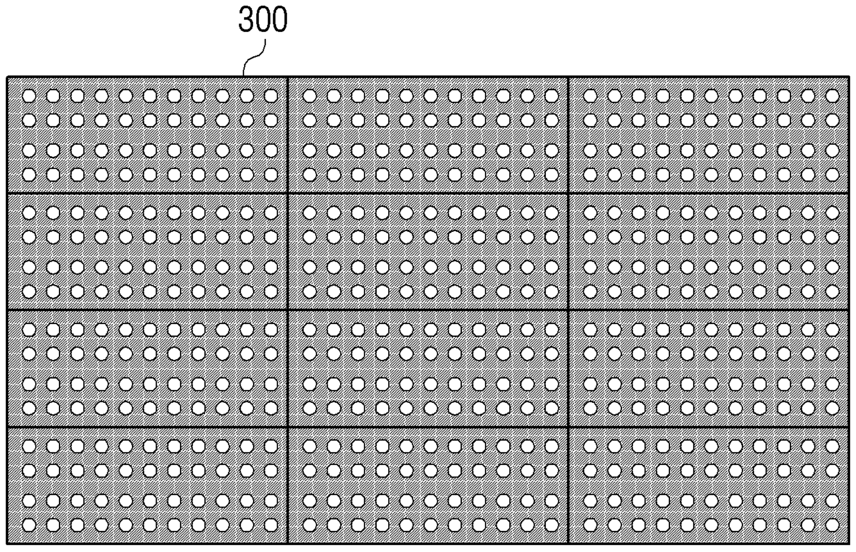
Figure 5C:
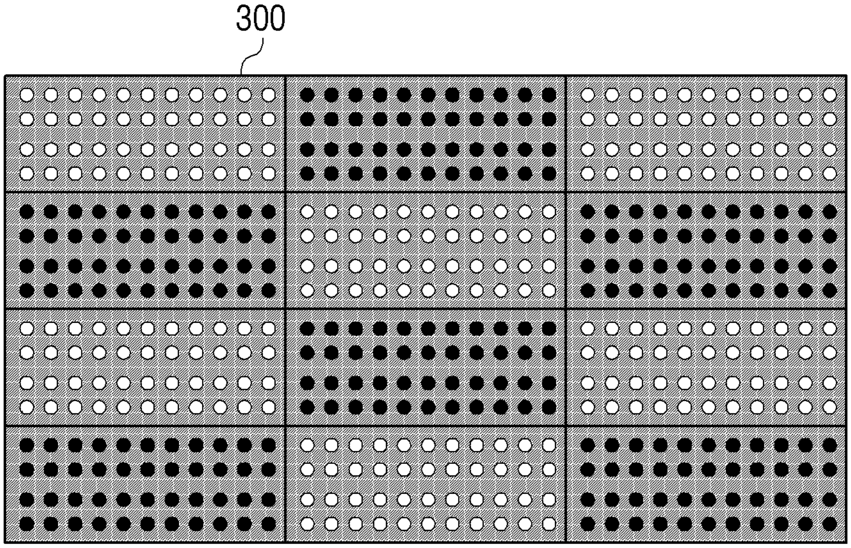

For example, if the display panel of the display panel apparatus 300 is calibrated with respect to each of pixels, calibration is uniformly performed with respect to all pixels as shown in FIG. 5B. If the display panel is calibrated with respect to each of modules, pixel values may be differently set according to modules as shown in FIG. 5C. However, if the calibration is performed with respect to each pixel as shown in FIG. 5B, there is a large amount of data to be processed, and thus a calibration time may be delayed. If the calibration is performed with respect to each module as shown in FIG. 5C, pixel values may be differently set according to modules, and thus brightness and colors are different according to the modules.

Figure 5D:
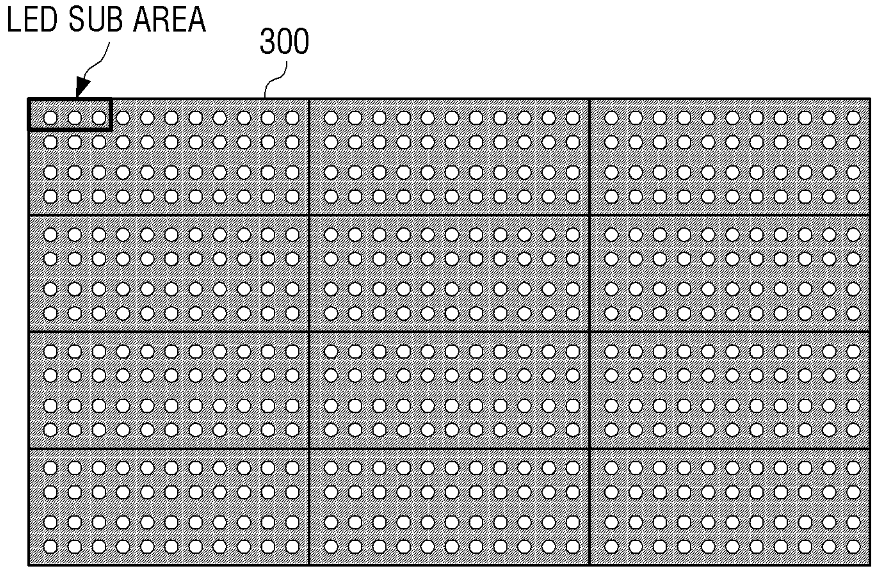
Figure 5E:
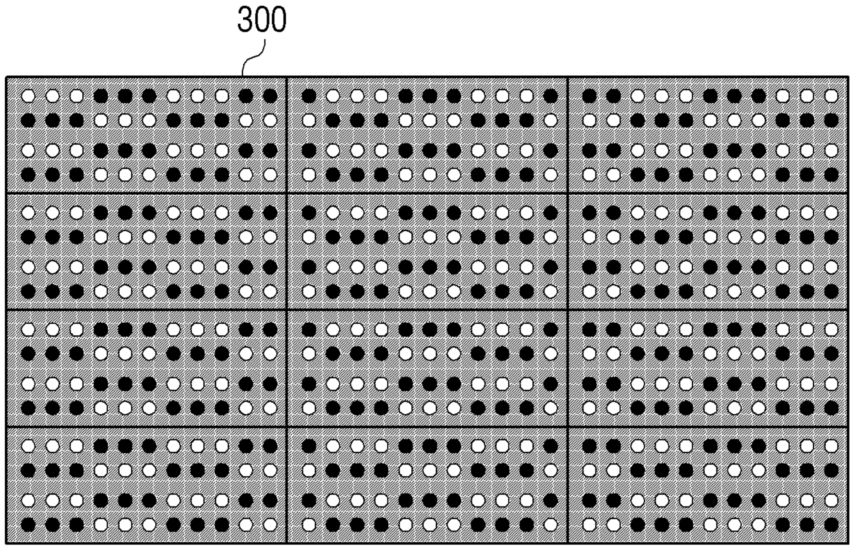

FIG. 5D illustrates a display panel where calibration is performed with respect to each sub area, according to an exemplary embodiment. In other words, the electronic apparatus 100 may calculate a calibration value by dividing the display panel into sub areas each including a plurality of pixels. In this case, the electronic apparatus 100 may perform calibration with respect to each of a plurality of sub areas. In other words, referring to FIG. 5E, if calibration is performed with respect to each of a plurality of sub areas, a calibration time may be reduced, and an optimum calibration performance may be realized by adjusting sizes of the plurality of sub areas.

Figure 6:
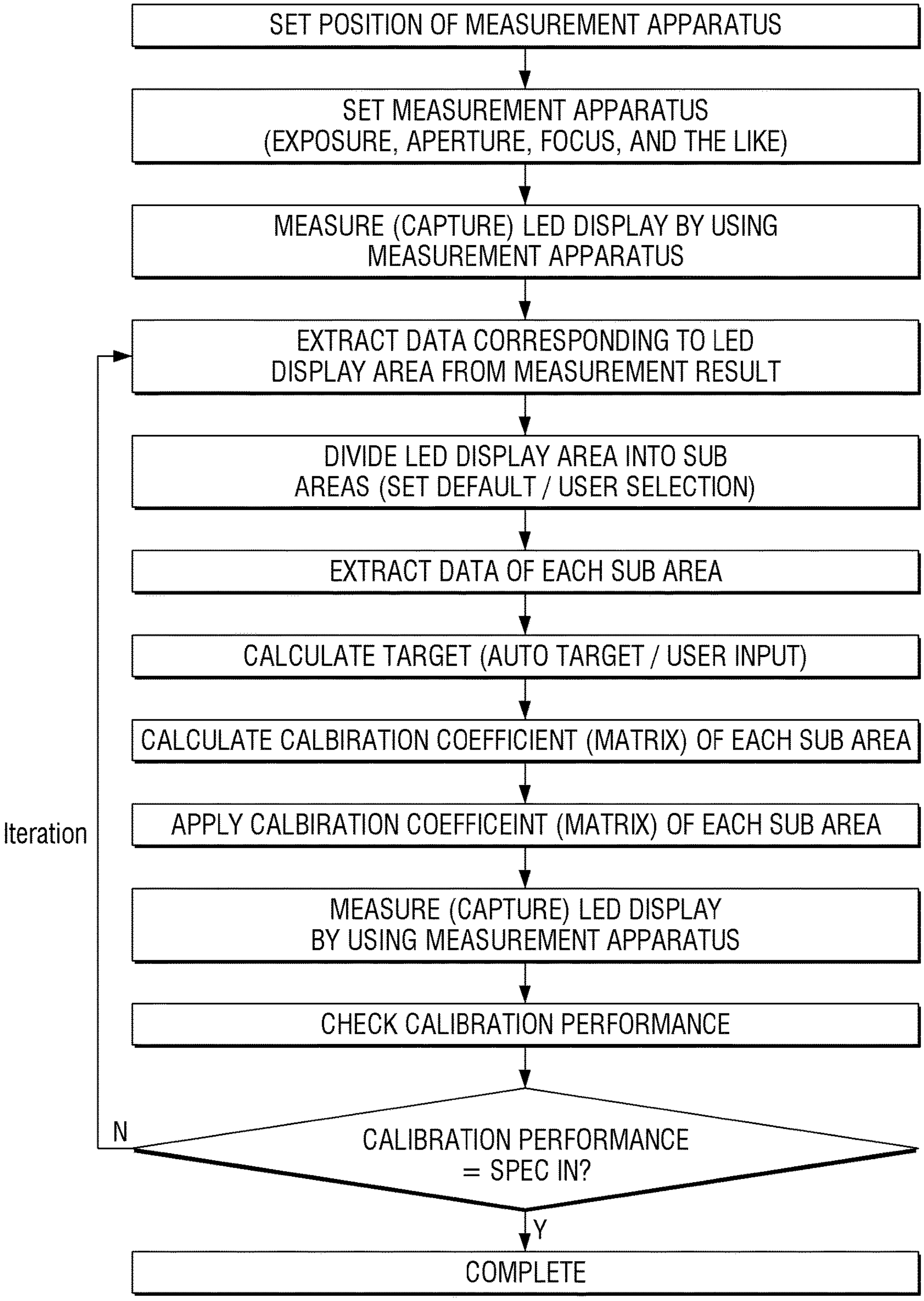
FIG. 6 is a flowchart of a method of calibrating a display panel apparatus of a display panel apparatus calibration system, according to an exemplary embodiment.

FIG. 6 is a flowchart illustrating a method of calibrating a display panel apparatus of a display panel apparatus calibration system in detail, according to an exemplary embodiment.

Referring to FIG. 6, the measurement apparatus 200 may be installed in a position at a preset distance from the display panel apparatus 300, and the position of the measurement apparatus 200 may be fixed when performing pixel calibration of a display panel of the display panel apparatus 300. An exposure, an aperture, a focus, and the like of the measurement apparatus 200 may be automatically or manually set. The display panel may be captured by using the measurement apparatus 200. The electronic apparatus 100 may divide the captured image into a plurality of sub areas. In this case, the electronic apparatus 100 may automatically set sizes of the plurality of sub areas based on a resolution of the display apparatus 300 or may receive sizes of the plurality of sub areas from a user.

The electronic apparatus 100 may calculate data of each of a plurality of sub blocks. Here, the data may be a representative value which is acquired by calculating an average value of brightness and color values of pixels constituting the plurality of sub blocks. The electronic apparatus 100 sets a target value based on the calculated representative value. In this case, the target value may be a value input from the user. Thereafter, the electronic apparatus 100 may calculate calibration values of the plurality of sub blocks and transmit the calculated calibration values to the display panel apparatus 300.

If the calibration values are received, the display panel apparatus 300 performs calibrations by respectively applying the calibration values to pixel values of a sub area. If calibrations are performed with respect to pixels of the display panel of the display panel apparatus 300, the measurement apparatus 200 checks a calibration performance by capturing the display panel of the display panel apparatus 300. In detail, if a pixel value of the display panel is within a preset value, calibration may be ended by determining the pixel value as spec in. If at least one of pixel values of the display panel is larger than a preset value, calibration may be iterated by determining the at least one pixel value as spec out.

Figure 7:
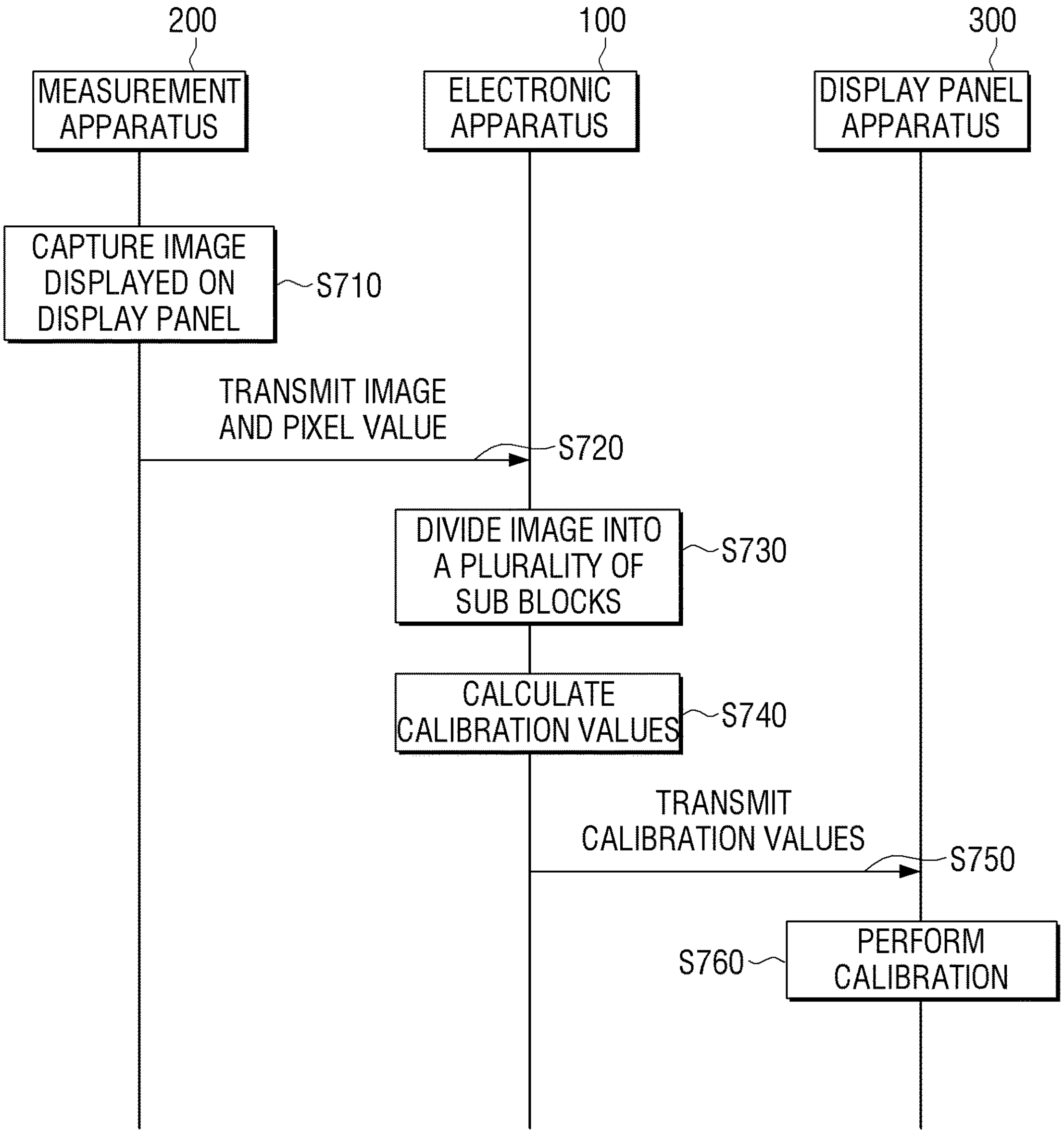
FIG. 7 is a sequence diagram illustrating an operation of a display panel apparatus calibration system, according to an exemplary embodiment.

FIG. 7 is a sequence diagram illustrating an operation of a display panel apparatus calibration system, according to an exemplary embodiment.

In operation S710, the measurement apparatus 200 may extract a pixel value of each pixel of a display panel by capturing a preset image displayed on the display panel and measuring brightness and color corresponding to the captured image. In operation S720, the measurement apparatus 200 may transmit the captured image and the extracted pixel value of each pixel to the electronic apparatus 100.

In operation S730, the electronic apparatus 100 divides the received captured image into a plurality of sub blocks. Here, sizes of the plurality of sub blocks may be determined according to a resolution of the display panel apparatus 300 or by an input of a user.

The electronic apparatus 100 may calculate representative values of the plurality of sub blocks in operation S730 and set a target value based on the calculated representative values in operation S740. In operation S740, the electronic apparatus 100 may calculate calibration values of the plurality of sub blocks based on the target value and the representative values of the plurality of sub blocks. If the calibration values of the plurality of sub blocks are calculated, the electronic apparatus 100 transmits the calculated calibration values to the display panel apparatus 300 in operation S750.

In operation S760, the display panel apparatus 300 may perform calibration with respect to each pixel by applying the received calibration values to pixel values of pixels included in the plurality of sub blocks.

Figure 8:
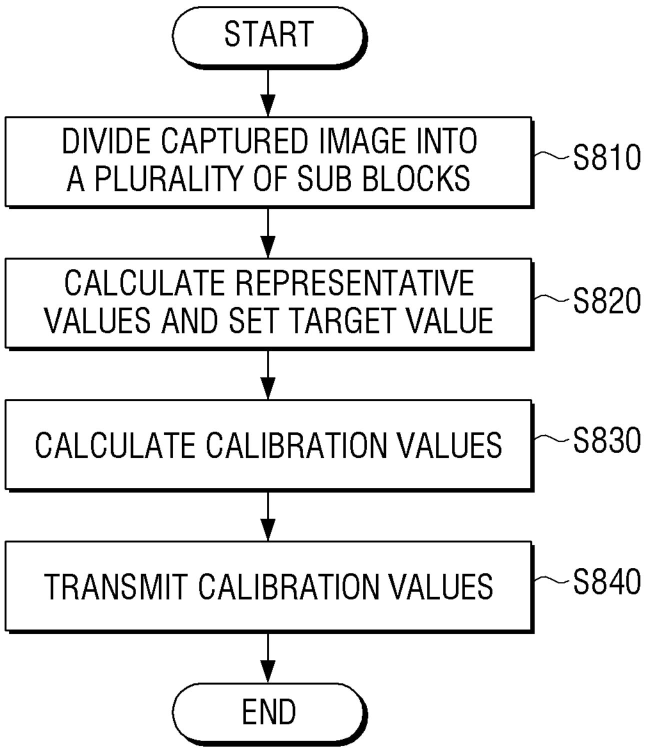
FIG. 8 is a flowchart of a method of controlling an electronic apparatus, according to an exemplary embodiment.

FIG. 8 is a flowchart of a method of controlling an electronic apparatus, according to an exemplary embodiment.

According to the method of controlling the electronic apparatus shown in FIG. 8, the electronic apparatus divides an image acquired by capturing a display panel into a plurality of sub blocks in operation S810. Here, the captured image may be an image acquired by capturing R, G, and B of a full color or an image acquired by capturing R, G, B, and W of a full color.

In operation S820, the electronic apparatus calculates representative values of the plurality of sub blocks.

The electronic apparatus sets a target value based on the calculated representative values in operation S820 and calculates calibration values of the plurality of sub blocks based on the set target value and the representative values of the plurality of sub blocks in operation S830.

In operation S840, the electronic apparatus transmits the calculated calibration values to a display panel apparatus.

Also, in operation S820, the electronic apparatus may calculate an average value of pieces of data indicating brightness and color of each of a plurality of pixels constituting a sub block as a representative value of the sub block.

In addition, in the method of controlling the electronic apparatus, the pieces of data indicating brightness and color of each of the plurality of pixels may be pixel data in a CIE xyY color space indicating color and brightness of a pixel.

In operation S830, the electronic apparatus may set an average value of a plurality of representative values respectively corresponding to a plurality of sub blocks as a target value.

In operation S810, the electronic apparatus may determine sizes of the plurality of sub blocks based on a resolution of the display apparatus or a value input by a user.

In operations S840 and S850, the electronic apparatus may calibrate pixel values constituting the plurality of sub blocks based on the target value and the representative values of the plurality of sub blocks and transmit the calibrated pixel values to the display panel apparatus.

Also, in operations S840 and 850, the electronic apparatus may calculate pixel values of the plurality of sub blocks to be calibrated, based on the target value and the representative values of the plurality of sub blocks and transmit the calculated pixel values to the display panel apparatus.

In the method of controlling the electronic apparatus, the image acquired by capturing the display panel may be an image which is captured and then whose brightness and color are measured by a colorimeter.

Also, in the method of controlling the electronic apparatus, the image acquired by capturing the display panel may be an image captured by a camera installed inside or outside the electronic apparatus.

According to various exemplary embodiments as described above, calibration values respectively corresponding to sub areas may be calculated and then transmitted to a display panel apparatus. Therefore, a time taken for calibrating the display panel apparatus may be reduced, and a calibration performance may be optimized.

Methods according to various exemplary embodiments described above may be embodied by merely upgrading software of an existing electronic apparatus.

A non-transitory computer readable medium that stores a program sequentially performing a control method may be provided.

For example, there may be provided a non-transitory computer readable medium that stores a program performing dividing an image acquired by capturing a display panel into a plurality of sub blocks, calculating representative values of the plurality of sub blocks, calculating calibration values of the plurality of sub blocks based on a target value set based on the calculated representative values and the representative values of the plurality of sub blocks, and transmitting the calculated calibration values to a display panel apparatus.

The non-transitory computer readable medium is a medium which does not store data temporarily such as a register, cash, and memory but stores data semi-permanently and is readable by devices. More specifically, the aforementioned applications or programs may be stored in the non-transitory computer readable media such as compact disks (CDs), digital video disks (DVDs), hard disks, Blu-ray disks, universal serial buses (USBs), memory cards, and read-only memory (ROM).

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

Although a few embodiments have been shown and described, it would be appreciated by those skilled in the art that changes may be made in these embodiments without departing from the principles and spirit thereof, the scope of which is defined in the claims and their equivalents.

What is claimed is:

1. An electronic apparatus for calibrating a pixel value of a display panel constituting a display panel apparatus, the electronic apparatus comprising:
- a communicator; and
- a processor configured to:
  - identify a plurality of sub blocks in an image acquired by the display panel,
  - calculate representative value of each of the plurality of sub blocks,
  - calculate calibration value of each of the plurality of sub blocks based on a target value obtained based on the representative value of each of the plurality of sub blocks, and
  - transmit the calibration value to the display panel apparatus through the communicator,
  - wherein the processor identifies size of each of the plurality of sub blocks based on at least one of a resolution of the display panel apparatus and a value input by a user.

2. The electronic apparatus of claim 1, wherein the processor calculates an average value of pieces of data indicating brightness and color of each of a plurality of pixels constituting a sub block as a representative value of the sub block.

3. The electronic apparatus of claim 2, wherein the pieces of data indicating the brightness and color of each of the plurality of pixels are color coordinates x, y and luminance Y in a CIE xyY color space indicating color and brightness of a pixel.

4. The electronic apparatus of claim 1, wherein the processor obtains an average value of a plurality of representative values respectively corresponding to the plurality of sub blocks as the target value.

5. The electronic apparatus of claim 1, wherein the processor calibrates pixel value constituting each of the plurality of sub blocks based on the target value and the representative value of each of the plurality of sub blocks and transmits the calibrated pixel value to the display panel apparatus.

6. The electronic apparatus of claim 1, wherein the processor calculates pixel value of each of the plurality of sub blocks to be calibrated, based on the target value and the representative value of each of the plurality of sub blocks and transmits the calculated pixel value to the display panel apparatus.

7. The electronic apparatus of claim 1, wherein the image acquired by the display panel is an image which is captured and then whose brightness and color are measured by a colorimeter.

8. The electronic apparatus of claim 1, wherein the image acquired by the display panel is an image that is captured by a camera installed one of inside and outside the electronic apparatus.

9. A calibration system, comprising:
- a display panel apparatus;
- a measurement apparatus configured to capture a preset image displayed on a display panel and measure brightness and color corresponding to the image; and
- an electronic apparatus configured to identify a plurality of sub blocks in the image received from the measurement apparatus, calculate representative value of each of the plurality of sub blocks, calculate calibration value of each of the plurality of sub blocks based on a target value obtained based on the representative value of each of the plurality of sub blocks, and transmit the calibration value to the display panel apparatus,
- wherein the electronic apparatus identifies size of each of the plurality of sub blocks based on at least one of a resolution of the display panel apparatus and a value input by a user.

10. A method of controlling an electronic apparatus for calibrating a pixel value of a display panel constituting a display panel apparatus, the method comprising:

identifying a plurality of sub blocks in an image acquired by the display panel;

calculating representative value of each of the plurality of sub blocks;

calculating calibration value of each of the plurality of sub blocks based on a target value obtained based on the representative value of each of the plurality of sub blocks; and transmitting the calibration value to the display panel apparatus, wherein the identifying comprises identifying size of each of the plurality of sub blocks based on at least one of a resolution of the display panel apparatus and a value input by a user.

11. The method of claim 10, wherein the calculating of the representative value comprises calculating an average value of pieces of data indicating brightness and color of each of a plurality of pixels constituting a sub block as a representative value of the sub block.

12. The method of claim 11, wherein the pieces of data indicating the brightness and color of each of the plurality of pixels are color coordinates x, y and luminance Y in a CIE xy Y color space indicating color and brightness of a pixel.

13. The method of claim 10, wherein the calculating of the calibration value comprises obtaining an average value of a plurality of representative values respectively corresponding to the plurality of sub blocks as the target value.

14. The method of claim 10, wherein:

the calculating of the calibration value comprises calibrating pixel value respectively constituting the plurality of sub blocks based on the target value and the representative value of each of the plurality of sub blocks; and the transmitting comprises transmitting the calibrated pixel value to the display panel apparatus.

15. The method of claim 10, wherein:

the calculating of the calibration value comprises calculating pixel value of each of the plurality of sub blocks to be calibrated, based on the target value and the representative value of each of the plurality of sub blocks; and the transmitting comprises transmitting the calculated pixel value to the display panel apparatus.

16. The method of claim 10, wherein the image acquired by the display panel is an image which is captured and then whose brightness and color are measured by a colorimeter.

17. The method of claim 10, wherein the image acquired by the display panel is an image that is captured by a camera installed inside or outside the electronic apparatus.

* * * * *